United States Patent
Oh et al.

(10) Patent No.: US 9,262,186 B2
(45) Date of Patent: Feb. 16, 2016

(54) CODE REARRANGER AND METHOD FOR REARRANGING CODE FOR A VIRTUAL MACHINE

(75) Inventors: Hyeong-Seok Oh, Seoul (KR);
Hyung-Kyu Choi, Seoul (KR);
Dong-Heon Jung, Gyeongsan-si (KR);
Soo-Mook Moon, Seoul (KR);
Kue-Hwan Sihn, Hwaseong-si (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 210 days.

(21) Appl. No.: 13/189,655

(22) Filed: Jul. 25, 2011

(65) Prior Publication Data
US 2012/0185850 A1   Jul. 19, 2012

(30) Foreign Application Priority Data
Jan. 18, 2011   (KR) .................. 10-2011-0005143

(51) Int. Cl.
*G06F 9/45*      (2006.01)
*G06F 9/455*     (2006.01)

(52) U.S. Cl.
CPC .............. *G06F 9/4552* (2013.01); *G06F 8/443* (2013.01)

(58) Field of Classification Search
None
See application file for complete search history.

(56) References Cited

U.S. PATENT DOCUMENTS

| | | | |
|---|---|---|---|
| 7,263,689 B1* | 8/2007 | Edwards et al. | 717/127 |
| 7,450,131 B2* | 11/2008 | Swamy et al. | 345/565 |
| 2005/0028137 A1* | 2/2005 | Evans et al. | 717/110 |
| 2006/0259903 A1* | 11/2006 | Vernon | 717/174 |
| 2007/0150880 A1* | 6/2007 | Mitran et al. | 717/161 |
| 2008/0201698 A1* | 8/2008 | Perfetta et al. | 717/161 |
| 2009/0037891 A1* | 2/2009 | Wang | 717/148 |
| 2010/0115501 A1* | 5/2010 | Partridge et al. | 717/148 |
| 2010/0235819 A1* | 9/2010 | Rose | 717/139 |

* cited by examiner

*Primary Examiner* — H S Sough
*Assistant Examiner* — Abdou Seye
(74) *Attorney, Agent, or Firm* — NSIP Law

(57) ABSTRACT

Provided is an code rearranger and method for a virtual machine that uses a just-in-time-compiler (JITC) to manage a location of machine code stored in a code cache. The apparatus may rearrange consecutively-executable machine codes from among those stored in the code cache to be placed successively.

20 Claims, 5 Drawing Sheets

CODE REARRANGER AND METHOD FOR REARRANGING CODE FOR A VIRTUAL MACHINE

CROSS-REFERENCE TO RELATED APPLICATION(S)

This application claims the benefit under 35 U.S.C. §119(a) of Korean Patent Application No. 10-2011-0005143, filed on Jan. 18, 2011, in the Korean Intellectual Property Office, the entire disclosure of which is incorporated herein by reference for all purposes.

BACKGROUND

1. Field

The following description relates to a virtual machine that uses a just-in-time compiler (JITC) as a software execution environment.

2. Description of the Related Art

A virtual machine may be used to run an application in a device that is equipped with heterogeneous central processing units (CPUs) and memories.

Code that is written in a high-level language may be distributed, for example, as a script or as hardware-independent intermediate code. The code may be executed by the interpreters or the machine language translators of virtual machines that are installed in various devices.

Examples of a virtual machine include a JAVA® virtual machine, which is widely used in mobile phones, digital TVs, and the like. Other examples include JAVASCRIPT® which is code that may be transmitted via the web, a DALVIK® virtual machine, and the like.

Various applications may be run in various embedded devices such as mobile phones, digital TVs, servers, desktops, and the like, using virtual machines. Bytecode is generally distributed as execution code for a virtual machine to be run in diverse execution environments. The distributed bytecode may be executed by an interpreter. However, in executing bytecode, the interpreter is slower than when executing machine code. To prevent such a drawback and increase execution speed, a just-in-time compiler (JITC) may be utilized.

For example, the JITC may compile bytecode that is currently being executed into machine code, store the machine code in code cache of a virtual machine, and utilize the stored machine code while executing the compiled bytecode. The JITC may track a path from a certain position of bytecode in the course of running virtual machine, and generate machine code that corresponds to a predefined length of a bytecode trace.

The bytecode trace may be a segment of code of a predefined length of bytecode. The bytecode trace may prevent consumption of a large amount of time and/or the generation of an excessive amount of machine codes in the JITC.

In a tracking scheme, bytecode is executive in logically consecutive order, however, the order for a JITC to compile bytecode traces may not always follow the logical order for executing the bytecode.

Machine code generated by the JITC may be stored in a code cache of the virtual machine, and even when the bytecode is consecutive, the machine code may be stored in an inconsecutive manner if the machine code is generated at different times by the JITC.

Additionally, if the stored machine code has an increase in the number of jump instructions attached thereto, and if the length of each bytecode trace is short, the number of machine codes to be stored increases, and thus, the performance of the code cache may deteriorate.

SUMMARY

In one general aspect, there is provided a code rearranger for rearranging code for a virtual machine, the code rearranger including an information collecting unit configured to collect code information that indicates a relationship between bytecode and machine code, and a code arranging unit configured to rearrange machine code that is stored in a code cache based on the collected code information.

The code information may include location information about a location at which the generated machine code is stored in the code cache and tracking information about bytecode that is a reference of the generated machine code.

The code arranging unit may be further configured to confirm a logical order of executing the machine code that is stored in the code cache based on the tracking information, and to rearrange the machine code in the code cache according to the confirmed logical execution order.

The code information may further include information that is dependent on a location within the generated machine code.

The code arranging unit may be further configured to confirm the logical order of executing the machine code stored in the code cache based on the tracking information, to arrange the machine code in the code cache according to the confirmed logical execution order, and to amend the dependent information according to a rearranged location of the machine code.

The code arranging unit may be further configured to remove a jump code or a jump target which is attached to the machine code stored in the code cache.

The code arranging unit may be further configured to rearrange the stored machine code, in response to machine code generated by a just-in-time compiler (JITC) and stored in the code cache being more than a threshold amount.

In another aspect, there is provided a method of rearranging code for a virtual machine, the method including collecting code information that indicates a relationship between bytecode and machine code, and rearranging machine code stored in a code cache using the collected code information.

The code information may include location information about a location at which the generated machine code is stored in the code cache and tracking information about bytecode that is a reference of the generated machine code.

The rearranging of the machine code may comprise confirming a logical order of executing the machine code that is stored in the code cache based on the tracking information, and rearranging the machine code in the code cache according to the confirmed logical execution order.

The rearranging of the machine code may comprise removing a jump code or a jump target which is attached to the machine code that is stored in the code cache.

The method may further comprise, before the rearranging of the machine code, suspending an application that is being run on the virtual machine.

The suspending of the application may comprise suspending the application in response to the machine code generated by a just-in-time compiler (JITC) and stored in the code cache being more than a threshold amount.

The suspending of the application may comprise suspending the application in response to the number of machine codes generated by the JITC and stored in the code cache being more than a threshold amount.

In another aspect, there is provided a terminal that includes one or more virtual machines to be executed, the terminal including a compiler configured to compile bytecode of a virtual machine to generate machine code, a memory configured to store the generated machine code, and a code rearranger configured to determine the logical order of executing the generated machine code, and configured to rearrange the machine code stored in the memory to a logical order of executing the machine code.

The code rearranger may collect information from the compiler which includes a location at which generated machine code is stored and a bytecode that is a reference to the generated machine code.

The compiler may be a just-in-time compiler (JITC).

The code rearranger may be further configured to remove a jump code or a jump target from at least one rearranged machine code.

In response to the amount of machine code stored in the memory reaching a threshold, the code rearranger may rearrange the machine code stored in the memory.

Other features and aspects may be apparent from the following detailed description, the drawings, and the claims.

Figure 1:
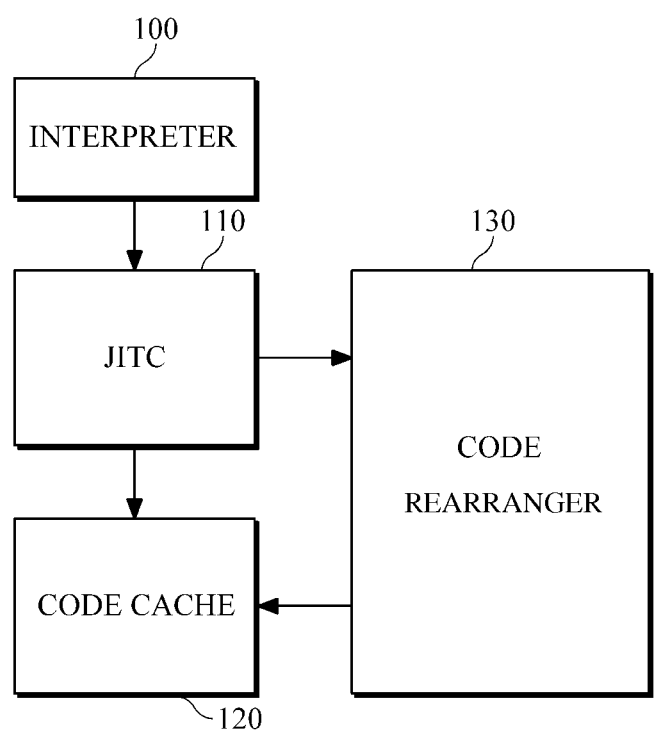
FIG. 1 is a diagram illustrating an example of a virtual machine (VM) that includes a code rearranger for rearranging code.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a virtual machine (VM) that includes a code rearranger for rearranging code. For example, the virtual machine may be included in a terminal such as a mobile terminal, a smart phone, a computer, a tablet, a home appliance, a sensor, and the like.

Referring to FIG. 1, the virtual machine includes an interpreter 100, a just-in-time compiler (JITC) 110, a code cache 120, and a code rearranger 130.

The interpreter 100 may execute bytecode that is distributed as execution code of the VM.

The JITC 110 may generate (i.e. compile) machine code of bytecode that is currently being executed, and the code cache 120 may store the generated machine code.

When re-executing a compiled bytecode trace, the VM may utilize the generated machine code that corresponds to the bytecode trace. For example, the machine code may be stored in the code cache 120 according to the order of generation. In determining the order of generating the machine code, bytecode traces may be defined in consideration of the number of executions of bytecode executed by the interpreter 100, such that a faster performance of the VM may be implemented. Hence, the order of defined bytecode traces may not match the order of executing the bytecode itself.

The code rearranger 130 may rearrange machine code that is stored in the code cache 120 according to a logical order of the corresponding bytecode, thereby implementing the VM with better performance.

Figure 2:
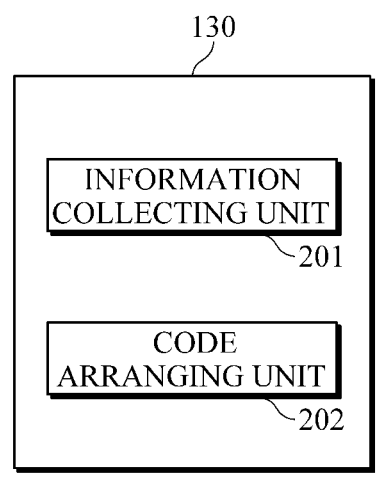
FIG. 2 is a diagram illustrating an example of a code rearranger.

FIG. 2 illustrates an example of a code rearranger.

Referring to FIG. 2, the code rearranger 130 includes an information collecting unit 201 and a code arranging unit 202.

The information collecting unit 201 may collect code information from a JITC that generates machine code. For example, the code information may include location information about a location at which the generated machine code is stored and tracking information about a bytecode that is a reference of the machine code. The machine code may be stored in a code cache and the location information may identify the location in the code cache. In addition, the code information may also include information that is dependent on a location inside the generated machine code. The information that is dependent on a location inside the generated machine code may refer to a function or the like which executes a call or a jump based on a specific location inside the generated machine code.

The code arranging unit 202 may rearrange the machine code that is stored in the code cache using the code information. For example, the code arranging unit 202 may confirm a logical execution order of the machine code that is stored in the code cache from the tracking information that is included in the code information, and may rearrange the machine code in the code cache according to the confirmed execution order.

In rearranging the machine code, the information that is dependent on the location inside the machine code which is included in the code information may be amended. Moreover, the code arranging unit 202 may remove a jump code or a jump target which is attached to the machine code that is stored in the code cache. An example of this process is described later.

When more than a threshold amount of machine code generated by the JITC has been stored in the code cache, the code arranging unit 202 may rearrange the stored machine code. For example, the threshold amount may be determined according to the overall system performance, for example, by taking into consideration the capacity of the code cache, operational status of the VM, a size or the number of machine codes to be generated, and the like.

Figure 3:
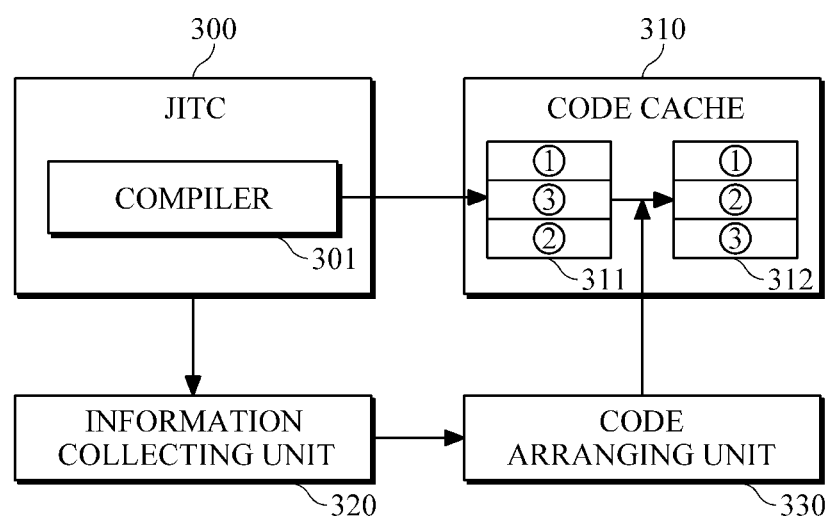
FIG. 3 is a diagram illustrating another example of a virtual machine that includes a code rearranger for rearranging code.

FIG. 3 illustrates another example of a virtual machine that includes a code rearranger for rearranging code. An example of the operation of the code rearranger is described with reference to FIG. 3.

Referring to FIG. 3, an information collecting unit 320 and a code arranging unit 330 which are included in the code rearranger are running while machine code generated by a JITC 300 is being stored in a code cache 310.

While a compiler 301 in the JITC 300 is generating machine code, the information collecting unit 320 may collect code information that is a result from the compiler 301.

The code cache 310 may store the machine code that is generated by the compiler 301 in the order of receiving the machine code from the JITC 300. Hence, the order of machine code stored in the code cache 310 may be different from the logical order of executing the corresponding bytecode.

In the example of FIG. 3, the logical order of the bytecode is ①②③. However, the machine code 311 is initially stored in the code cache 310 in the order of [①③②] with respect to the logical order of corresponding bytecode. This storing order differs from the logical order of the corresponding bytecode.

The code arranging unit 330 may rearrange the machine code 311 that is stored in the code cache 310 according to the logical order of executing the bytecode. For example, the code arranging unit 330 may use the code information and the tracking information collected by the information collecting unit 320. The code arranging unit 330 may use a location of machine code in the code cache that is included in the code information and the tracking information about the bytecode which is a reference of the generated machine code, to rearrange the machine code 311.

As a result of rearrangement, the machine code 311 may be placed in the logical order ①②③ as denoted by 312 in FIG. 3. However, in the course of rearranging the machine code 311, an application that is being run on the virtual machine may be suspended. This is because an error in executing the application may occur while the machine code stored in the code cache is rearranged while the application is running.

Figure 4:
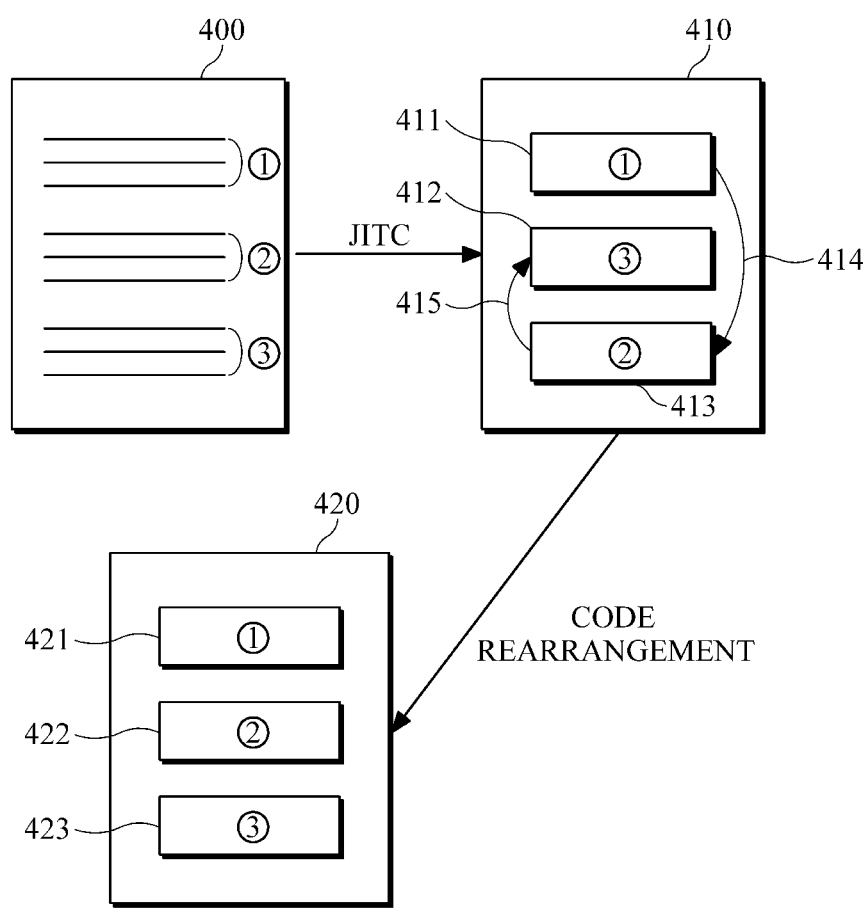
FIG. 4 is a diagram illustrating an example of the rearrangement of machine code in a code cache.

FIG. 4 illustrates an example of rearrangement of machine code in a code cache. Referring to FIG. 4, bytecode that is currently being executed is compiled into machine code, the machine code is stored, and the stored machined code is then rearranged.

The bytecode 400 is divided into bytecode groups ①, ②, and ③ according to a logical order of execution, and the generated bytecode groups ①, ②, and ③ are transmitted to a JITC. In this example, the order of transmitting the bytecode groups to the JITC may be different from a logical order of executing the bytecode 400, for example, because the bytecode groups may be transmitted according to conditions for improving the performance of the VM, such as the numbers of executions of each bytecode group.

In FIG. 4, the order of transmitting the bytecode groups to the JITC is ①, ③, and ②, and accordingly, machine code is compiled in the order of ①(411), ③(412), and ②(413) and stored in the code cache 410 in that same order.

However, the logical order of execution is an important factor for the VM to execute the machine code. In this example, a jump instruction (e.g., jump code 414, jump target 415, or the like) is attached to each machine code to ensure the machine code is executed according to the logical order.

In this example, the code rearranger may perform rearrangement on the code cache 410 according to the logical order, and thereby the machine code may be stored in the code cache 420 in the logical order of ①(421), ②(422), and ③(423).

For example, locations of the machine codes 411, 412, and 413 in the code cache 410 and tracking information (①, ③, ②) about bytecode groups which are references of the respective machine codes 411, 412, and 413 may be used to determine whether the order of storing the machine codes 411, 412, and 413 in the code cache 410 is the same as the logical order of executing the bytecode which is ①, ②, and ③.

In this example, the jump instructions 414 and 415 attached to the machine codes 411 and 413 may be removed. The locations of the machine codes 411, 412, and 413 in the code cache 410 and the tracking information (①, ③, ②) about the bytecode groups that are reference of the respective generated machine codes 411, 412, and 413 may be used to rearrange the machine codes 411, 412, and 413. As a result of the rearrangement, the code cache 420 has the machine codes stored in the logical order of ①(421), ②(422), and ③(423).

Figure 5:
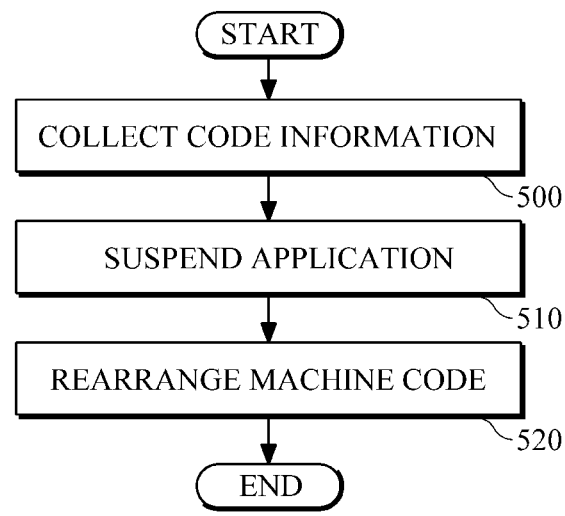
FIG. 5 is a flowchart illustrating an example of a method of rearranging code.

FIG. 5 illustrates a flowchart of an example of a method of rearranging code.

Referring to FIG. 5, while an application is being run on a virtual machine, code information is collected from a just-in-time complier (JITC) that is generating machine code (500). For example, the collected code information may include location information about a location at which the generated machine code is stored in a code cache and tracking information about bytecode that is a reference of the generated machine code.

Based on the collected code information, whether the generated machine code is stored in the code cache according to the logical order of executing the bytecode is checked, and if the machine code is not stored according to the logical order, an application is suspended if more than a threshold amount of machine code has been stored in the code cache (510).

Next, using the code information collected in operation 500, the machine code stored in the code cache is rearranged according to the logical order of executing the bytecode (520).

During rearrangement (520), for example, a jump code or a jump target may be removed if it is attached to the machine code. Once the code rearrangement is completed (520), the application is run again on the virtual machine, and procedures from operation 500 may be repeated.

As described herein, the code rearranger and method for rearranging code may increase the locality of machine code that is stored in a code cache in a virtual machine (VM) that uses a ETC. In addition, with the increase of locality of machine code, the performance of code cache may be improved. Furthermore, rearrangement of machine code that is stored in the code cache enables removing a jump instruction, and thereby execution performance of the machine code can be improved.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A code rearranger for rearranging code for a virtual machine, the code rearranger comprising:
   a storage device comprising a code cache configured to store machine code;
   an information collecting unit configured to collect code information that indicates a relationship between bytecode that has been compiled to generate the stored machine code and the stored machine code; and
   a code arranging unit configured to rearrange the stored machine code based on the collected code information including the relationship between the bytecode and the stored machine code.

2. The code rearranger of claim 1, wherein the code information includes location information about a location at which the stored machine code is stored in the code cache and tracking information about bytecode that is a reference of the stored machine code.

3. The code rearranger of claim 2, wherein the code arranging unit is further configured to confirm a logical order of executing the stored machine code based on the tracking information, and to rearrange the stored machine code according to the confirmed logical execution order.

4. The code rearranger of claim 2, wherein the code information further includes information that is dependent on a location within the stored machine code.

5. The code rearranger of claim 4, wherein the code arranging unit is further configured to confirm the logical order of executing the stored machine code based on the tracking information, to arrange the stored machine code in the code cache according to the confirmed logical execution order, and to amend the dependent information according to a rearranged location of the stored machine code.

6. The code rearranger of claim 1, wherein the code arranging unit is further configured to remove a jump code or a jump target which is attached to the stored machine code.

7. The code rearranger of claim 1, wherein the code arranging unit is further configured to rearrange the stored machine code, in response to machine code generated by a just-in-time compiler (JITC) and stored in the code cache being more than a threshold amount.

8. The code rearranger of claim 1, wherein the collected code information comprises a logical order of the bytecode, and the stored machine code is rearranged according to the logical order of the bytecode.

9. A method of rearranging code for a virtual machine, the method comprising:
   storing machine code in a code cache;
   collecting code information that indicates a relationship between bytecode that has been compiled to generate the stored machine code and the machine code; and
   rearranging the stored machine code based on the collected code information including the relationship between the bytecode and the stored machine code.

10. The method of claim 9, wherein the code information includes location information about a location at which the stored machine code is stored in the code cache and tracking information about the bytecode corresponding to the stored machine code.

11. The method of claim 10, wherein the rearranging of the stored machine code comprises confirming a logical order of executing the stored machine code based on the tracking information, and rearranging the stored machine code according to the confirmed logical execution order.

12. The method of claim 9, wherein the rearranging of the stored machine code comprises removing a jump code or a jump target which is attached to the stored machine code.

13. The method of claim 9, further comprising:
   before the rearranging of the stored machine code, suspending an application that is being run on the virtual machine.

14. The method of claim 13, wherein the suspending of the application comprises suspending the application in response to machine code generated by a just-in-time compiler (JITC) and stored in the code cache being more than a threshold amount.

15. The method of claim 13, wherein the suspending of the application comprises suspending the application in response to a number of machine codes generated by a JITC and stored in the code cache being more than a threshold amount.

16. A terminal that includes one or more virtual machines to be executed, the terminal comprising:
   a compiler configured to compile bytecode of a virtual machine to generate machine code;
   a memory configured to store the generated machine code; and
   a code rearranger configured to determine a logical order of executing the bytecode, and configured to rearrange the machine code stored in the memory according to the logical order of executing the bytecode.

17. The terminal of claim 16, wherein the code rearranger collects information from the compiler which includes a location at which the generated machine code is stored and a bytecode that is a reference to the generated machine code.

18. The terminal of claim 16, wherein the compiler is a just-in-time compiler (JITC).

19. The terminal of claim 16, wherein the code rearranger is further configured to remove a jump code or a jump target from at least one rearranged machine code.

20. The terminal of claim 16, wherein, in response to an amount of machine code stored in the memory reaching a threshold, the code rearranger rearranges the machine code stored in the memory.

* * * * *